US005236140A

United States Patent [19]

Hirschmann

[11] Patent Number: 5,236,140

[45] Date of Patent: Aug. 17, 1993

[54] PROCESS AND APPARATUS FOR WRAPPING UP ARTICLES, PARTICULARLY BOBBINS PROVIDED WITH ELECTRICAL WINDING, WITH TAPE

[76] Inventor: Gregory C. Hirschmann, Rautistrasse 12, 8047, Zurich, Switzerland

[21] Appl. No.: 429,272

[22] Filed: Oct. 31, 1989

[30] Foreign Application Priority Data

Oct. 31, 1988 [CH] Switzerland ........................ 4053/88

[51] Int. Cl.[5] ...................... H02G 13/02; B65H 39/16

[52] U.S. Cl. .................................. 242/7.08; 156/447; 156/530

[58] Field of Search .................. 242/7.08, 56 R, 7.15, 242/56.1, 56.2; 156/530, 570, 516, 285, 447, 478, 492, 493

[56] References Cited

U.S. PATENT DOCUMENTS

| | | | |
|---|---|---|---|
| 4,470,555 | 9/1984 | Lawson | 242/56.2 |
| 4,869,763 | 9/1989 | Arnold | 242/7.08 |
| 4,878,628 | 11/1989 | Takeda | 242/7.08 |
| 4,921,567 | 5/1990 | Criswell, Jr. | 242/7.08 |
| 4,948,454 | 8/1990 | Arnold | 242/7.08 |

*Primary Examiner*—Katherine Matecki

*Attorney, Agent, or Firm*—EGLI International

[57] ABSTRACT

In a process and apparatus for wrapping up articles, particularly for wrapping up of electrical windings applied to bobbins with a tape, a tape is drawn from a tape reel mounted on a reel holder. The apparatus includes a deflecting and measuring device for determining a tape tension during the removal and wrapping up process, a contacting and application station for the tape which is self-adhesively applied to the bobbin winding, a winding station provided with a pendulum part and a control unit having at least one computer and a number of control devices. The control unit is used for forming controlled and adjustable signals for the tape winding and tape speed, for the tape tension and for the direction of deflection of the pendulum part depending on an instantaneous running direction of the tape. The bobbin with the winding is interchangeably fitted onto a fit-on mandrel.

12 Claims, 3 Drawing Sheets

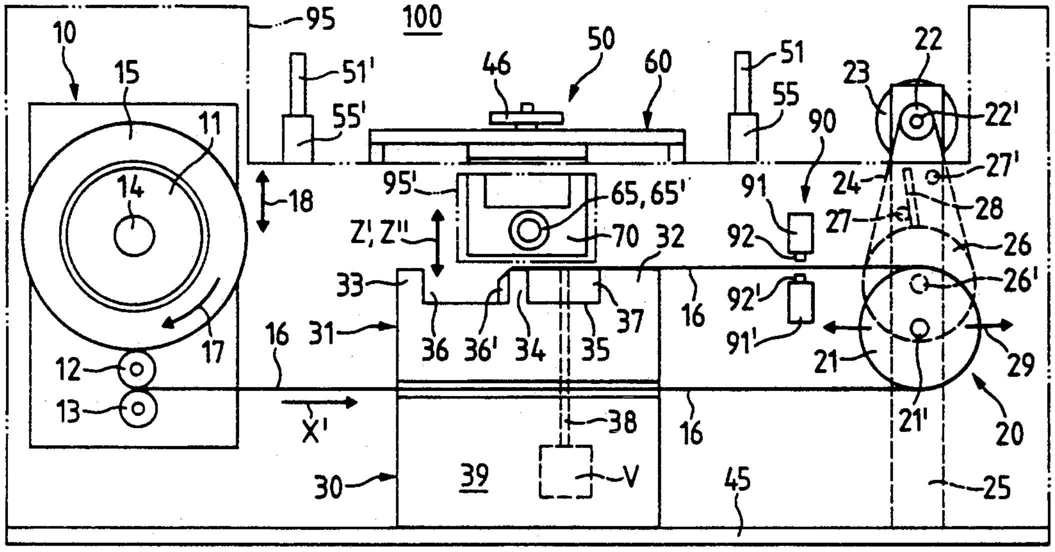
FIG. 1
FIG. 2
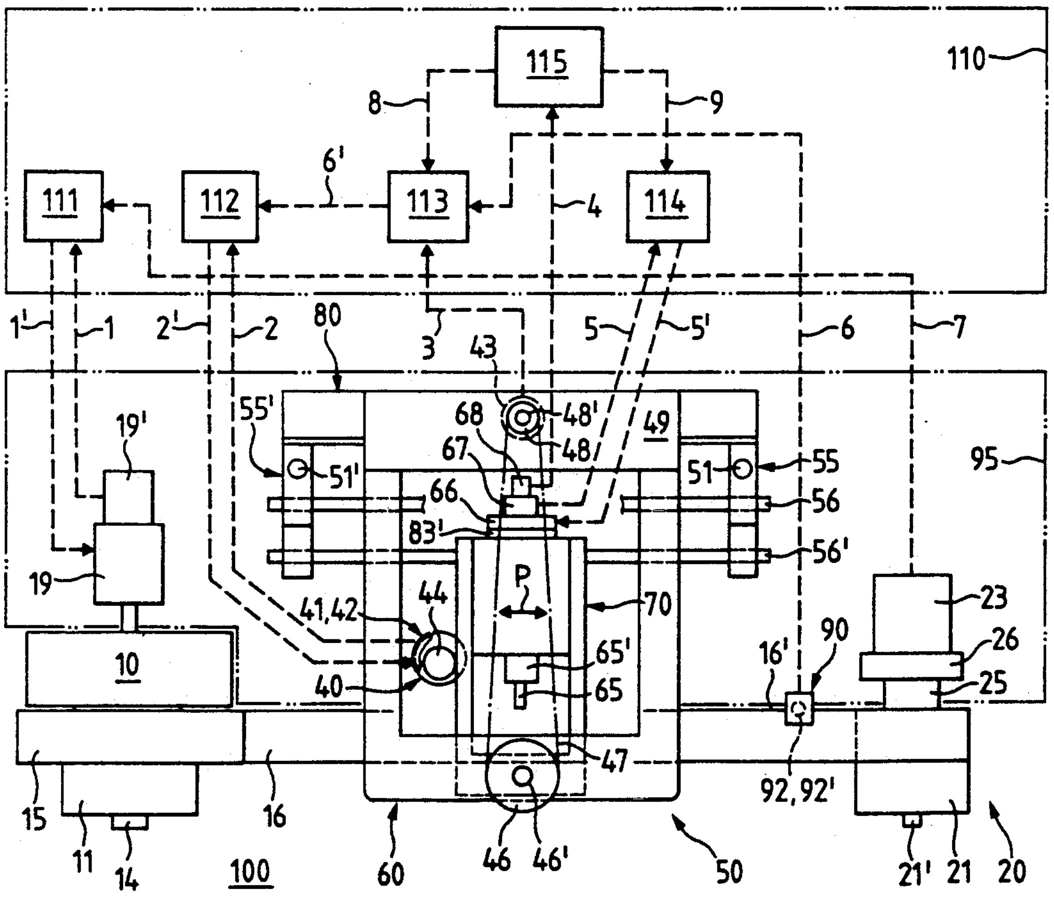

PROCESS AND APPARATUS FOR WRAPPING UP ARTICLES, PARTICULARLY BOBBINS PROVIDED WITH ELECTRICAL WINDING, WITH TAPE

BACKGROUND OF THE INVENTION

The present invention relates to a process and an apparatus for trussing or wrapping up articles, particularly for wrapping of an electrical winding applied to a coil member or bobbin with a corresponding tape, which is drawn from a rotary tape reel, deflected at a roll located at a distance from the reel and is adhesively applied to the electrical winding of the coil member fitted into a fit-on mandrel driven in rotary manner about its longitudinal axis.

In the automation of wrapping up of various elements, particularly for the insulation protection thereof and/or protection against mechanical damage, particularly in case of covering an electrical winding applied to a coil bobbin with a tape, the problem exists that the tape drawn from the tape reel essentially by the rotary movement of the bobbin does not satisfy modern requirements of being applied in an exactly oriented, positionally stable manner, so as to cover the entire width of the electrical winding into the marginal areas thereof.

SUMMARY OF THE INVENTION

It is an object of the present invention to provide a process and an apparatus for wrapping up coils with a tape, which would ensure a precisely oriented or aligned trussing or taping process.

According to the process of the present invention, the bobbin with an electrical winding to be wrapped up with a tape is fitted onto a rotatably driven mandrel and is adhesively engaged with the tape resting on a support part simultaneously with the uniform removal of the tape from the tape reel, wherein the electrical winding is wrapped up with the tape and the tape is subsequently cut. During the tape removal and the tape-winding process, depending on at least one tape edge, continuously scanned with suitable means, the fit-on mandrel together with the bobbin are oriented relative to the tape or the tape edge by a common pivoting movement.

The apparatus for performing the process according to the present invention comprises a reel holder for a rotary mounting of a tape reel, a guide pulley for the tape drawn from the tape reel, and a fit-on mandrel rotatably driven about its longitudinal axis for receiving a bobbin with an electric winding. The apparatus in the tape conveying direction is further provided with a winding station arranged in spaced manner between the reel holder and the guide pulley and receiving the fit-on mandrel, a contacting and application station for the tape which is adhesively applied to the bobbin and being associated with the winding station; a scanning device for determining the tape running direction with respect to the bobbin, which is adjustable to the tape and arranged between the guide pulley and the winding station. The scanning device comprises a corresponding control unit, which has members for forming adjustable and controlled values for the tape speed, tape tension and deflection of the fit-on mandrel and the bobbin, in dependence upon the instantaneous tape running direction.

The aforementioned objects, features and advantages of the invention will, in part, be pointed out with particularity, and will, in part, become obvious from the following more detailed description of the invention, taken in conjunction with the accompanying drawing, which form an integral part thereof.

BRIEF DESCRIPTION OF THE DRAWING

FIG. 1 is a diagrammatic top plan view of the apparatus for wrapping up electrical windings with a tape material drawn off a reel;

FIG. 2 is a diagrammatic top plan view of the apparatus according to FIG. 1;

DETAILED DESCRIPTION OF THE PREFERRED EMBODIMENTS

Figure 3A:
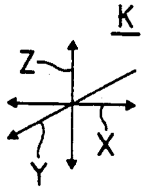
FIG. 3 is a schematic exploded perspective view of a winding station of the apparatus according to FIGS. 1 and 2.

FIGS. 1 and 2 diagrammatically show an apparatus according to the invention. The apparatus is, on the one hand, constructed for the precise wrapping or taping of electrical windings applied to bobbins or the like with a tape material drawn from a first winding reel and, on the other hand, for the subsequent treatment, by printing or the like, of the tape material drawn from the first winding reel to be exactly wound onto an associated element or onto a second winding reel.

FIG. 1 shows an apparatus 100 for the wrapping or taping of electrical windings applied to correspondingly constructed coil formers or bobbins, not shown in FIG. 1. The apparatus essentially comprises a first reel holder 10, a deflecting and measuring device 20, a scanning device 90, an application station 30 and a winding station 50 comprising several functional elements. The individual means and stations 10, 20, 30, 50 and 90, as shown in FIGS. 1 and 2, are positioned in the interior of or externally on a casing 95, the outer contour of which is shown by dot-dash lines, and a more detailed description thereof will be given hereinafter.

On the reel holder 10 formed as a casing, a cylinder body 11 is mounted so as to rotate about a shaft 14. Cylinder body 11 serves to receive a tape reel 15. At a distance from shaft 14, reel holder 10 also carries two rolls 12, 13 rotatably mounted about longitudinal axes thereof. Rolls 12 and 13 are spaced from each other and have each, for drawing the tape 16 from tape reel 15, a grooved or similarly constructed, cylindrical surface (not shown). The cylinder body 11 rotatable in arrow direction 17, together with tape reel 15 about shaft 14 is mounted in reel holder 10 in a continuously vertically adjustable manner relative to roll 12 as shown by arrow directions 18, for receiving tape reels of different external diameters. Any conventional adjustment means for adjusting cylinder body 11 in arrow directions 18 can be used. The tape reel 15 mounted on cylinder body 11 rests under its own weight on the associated roll 12, even on reducing the tape reel external diameter. Roll 12 is operatively connected to a drive, e.g. an electromotive drive 19 diagrammatically shown in FIG. 2, and drive 19 is operatively connected to a correspondingly associated speed or revolution counter 19'. In the exemplified embodiment, the other roll 13 merely serves as a pressing roll.

As considered in the conveying direction X' of tape 16, spaced from the reel holder 10, is provided the deflecting and measuring device 20, which essentially comprises a support 25, a first disk 22 and a second disk 26, as well as a guide pulley 21 for tape 16. The first disk 22 provided with an external tooth system is mounted to pivot about a shaft 22' and the second disk 26, also provided with an external tooth system is mounted to pivot about a shaft 26' provided on a support 25 fixed by not shown means to a base plate 45. The two disks 22, 26 are operatively interconnected by means of a belt-like drive 24 provided with a corresponding tooth system. The guide pulley 21 for tape 16 is mounted on a shaft 21' located on disk 26 and eccentric with respect to shaft 26'. To the outer circumference of the second disk 26, is fixed a pendulum-like lever 28, which can deflect or oscillate between two journal-like stops 27, 27' fixed to support 25.

As a result of the eccentric mounting of guide pulley 21 on the disk 26 pivotable about shaft 26' between the two stops 27, 27', the guide pulley 21 operatively connected with a spring element not shown in FIG. 1, can be deflected in the direction of arrow 29 against the restoring force of the spring element. The deflecting movement of guide pulley 21 which is by a few radians and essentially corresponds to the tensile stress acting on tape 16 during the wrapping up process, is transferred via drive 24 to shaft 22' operatively connected to an angle encoder 23 and detected by the latter.

At a distance from the deflecting and measuring device 20 is provided, the scanning device 90, which is e.g. constructed as an optronic scanning device having two spaced-apart head pieces 91, 91'. Scanning device 90 has at least two sensors 92, 92', which can be set by any suitable means in not shown manner to an edge 16' of tape 16 serving as a reference (FIG. 2). The tape 16 drawn from tape reel 15 is guided on pulley 21 and between the two spaced head pieces 91, 91', wherein it is scanned by the sensors 92, 92', preferably in cursory manner.

As shown in FIG. 1, between reel holder 10 and the deflecting and measuring device 20, is provided a tape-contacting and application station 30, which essentially comprises a head piece 31 constructed as a fixing shoe, and a carrier part 39. Together with the head piece 31, carrier part 39 essentially forms a subassembly, the head piece 31 being fixed to carrier part 39 in interchangeable manner, e.g. by a plug connection or the like and is connected by means of a suction channel 38 to a vacuum pump V, preferably arranged in the carrier part 39. Head piece 31 is used for the adhesive application of the tape 16 drawn from tape reel 15 to an electrical winding of a not shown bobbin, as well as for separating or cutting the tape adhering to the winding after the actual winding process. The head piece 31 constructed in accordance with the bobbin provided with the electrical winding is provided with two recesses 35, 36 formed between two external webs 32, 33 and a central web 34. Recesses 35 and 36 are spaced-apart and dimensioned in accordance with the bobbin. One recess 35 accommodates a support member 37 made from an elastic material and which has at least one opening linked with the suction channel 38. Central web 34 is used for the guiding engagement of a cutting knife 36' or the like movable by any suitable not shown means towards the tape 16 to be cut off, in arrow direction Z'.

The winding station 50, diagrammatically shown in FIGS. 1 and 2, is positioned in the vicinity of application station 30. FIG. 1 shows through a recess 95' (dot-dash lines) provided on the end face of casing 95, a partly visible pendulum part 70, which will be described in greater detail hereinafter in connection with FIG. 3.

For the control of the individual functional sequences, a control unit 110 shown in shown in FIG. 2 by dot-dash lines, is associated with the wrapping or taping apparatus 100. Control unit 110 essentially comprises a computer 115 and several control devices or regulators 111, 112, 113, and 114, which are operatively connected by lines 1, 1'; 2, 2'; 3; 4; 5, 5'; 6; 7; 8 and 9 with the associated functional elements of the taping or wrapping apparatus 100. Regulator 111 is connected via lines 1, 1' with drive 19 operatively connected to roll 12, as well as speed counter 19'.

A deflecting device 40 diagrammatically shown in FIG. 2 and operatively connected via an eccentric disk 44 to the pendulum part 70 essentially comprises a drive 41, not shown in detail in FIG. 2, with the associated speed counter 42. Drive 41 is connected via line 2 to regulator 112 and speed counter 42 is connected via line 2' to regulator 112.

The winding station 50 diagrammatically shown in plan view in FIG. 2, essentially comprises a carrier part 60 and the pendulum part 70 mounted in swingable manner on carrier part 60. Pendulum part 70 is constructed for mounting therein a fit-on sleeve or mandrel 65 rotatably driven about its longitudinal axis. Mandrel 65 is constructed for the fixing thereon of a not shown bobbin provided with an electrical winding and is arranged interchangeably in a head piece 65' constructed as a holder. Fit-on mandrel 65 with head piece 65' is operatively connected to a drive, preferably with an electromotive drive 66 provided with an associated speed counter 67 and angle encoder 68. Drive 66 is connected via line 5' to regulator 114 and speed counter 67 is connected via line 5 also to regulator 114, whereas angle encoder 68 is connected via line 4 to computer 115.

The scanning device 90, positioned between the winding station 50 and deflecting and measuring device 20, is connected via line 6 to regulator 113 whereas angle encoder 23 is connected via line 7 to regulator 111. The two regulators 113, 114 are also connected via lines 8, 9 to computer 115.

First and second disks 46, 48 are operatively connected to the pendulum part 70 of winding station 50 and are in each case rotatably mounted on a corresponding shaft 46', 48'. Each disk is provided with a not shown external tooth system and operatively connected by a belt-like drive 47 provided with a corresponding tooth system. The shaft for supporting disk 48 is operatively connected to an angle encoder or gauge 43 and the latter via line 3 is connected to regulator 113. The angle encoder 43 which detects the deflection of pendulum part 70 can also be associated with deflecting device 40 in a not shown embodiment.

Figure 3:
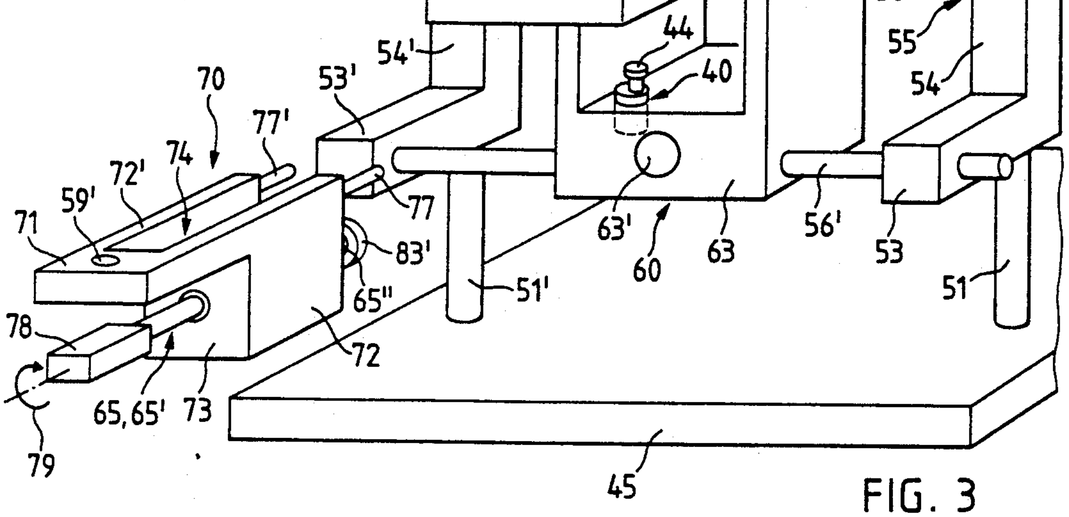

FIG. 3 is a partial perspective view of the winding station 50, which is described in detail below.

On base plate 45, are arranged two spaced-apart standards or uprights 51, 51' fixed to the base by not shown suitable means. A holding part 55, 55' is provided on each of uprights 51, 51', constructed in the form of vertical guide rods. The individual holding part 55, 55' having substantially an [-shaped profile cross-section, each has an upper flange 52, 52' and a lower flange 53, 53', the flanges 52, 53 and 52', 53' being in each case interconnected by a web 54, 54'. The two uprights 51, 51' are located in through-bores provided in web 54, 54' and by means of upper portions penetrate the respective holding part 55, 55'. In the upper, somewhat shorter flanges 52, 52', is provided a guide rod 56 penetrating the flanges 52, 52' and positioned at right angles to uprights 51, 51', whilst a second guide rod 56' penetrates the two lower flanges 53, 53' and is somewhat longer than the first guide. On the two guide rods 56, 56' offset relative to one another, as shown in FIG. 2, is positioned and mounted the carrier body 60.

The carrier body 60, shown as a preferred embodiment and constructed as a subassembly shown in FIG. 3 has a substantially U-shaped plate 61, two side walls 62, 62' penetrated by the upper guide rod 56 and a spacer or intermediate piece 63 positioned between the two side walls 62, 62'. The spacer 63 has a recess 63, for receiving and mounting the electromotive drive 66 (FIG. 2). The two spaced-apart side walls 62, 62' form the lateral boundary for a gap 64, which accommodates the deflecting device 40 operatively connected by means of eccentric disk 44 with pendulum part 70. At its front end, the plate 61 is provided with a through-bore 59 for receiving an axle 46' (FIG. 2) for pendulum part 70 and for disk 46. On the end faces of side walls 62, 62' of carrier body 60, is provided, a shown in FIG. 2, a carrier plate 49 which is fixed by not shown means. On the carrier plate 49, is arranged the second disk 48 rotatable about shaft 48', as well as the angle gauge or encoder 43 operatively connected to shaft 48'.

Referring back to FIG. 3, it is seen that pendulum part 70 is constructed e.g. in one piece and has a U-shaped plate 71, two side walls 72, 72' and a spacer or web 73 positioned between the side walls, in which is arranged and mounted the head piece 65' for supporting the fit-on mandrel 65. The two spaced side walls 72, 72' form the lateral boundary for a gap 74. On each of the end faces of side walls 72, 72', is provided a journal 77, 77' fixed thereto in not shown manner. In the front area of plate 71, is provided a through-bore 59' for receiving the axle 46' (FIG. 2). In the assembled state, the pendulum part 70 is swingably mounted in arrow direction P by means of the axle 46', on the one hand, on plate 61, and, on the other hand, by means of the two journals 77, 77' in the gap 64 of carrier body 60 on guide rod 46, as shown in FIG. 2.

Carrier part 60 and the pendulum part 70 pivotably mounted thereon in the arrow directions P essentially form a subassembly which, according to the coordinate system K (FIG. 3*a*) is substantially vertically movable in arrow directions Z on uprights 51, 51' and approximately horizontally in arrow directions X on guide rods 56, 56'.

Figure 4:
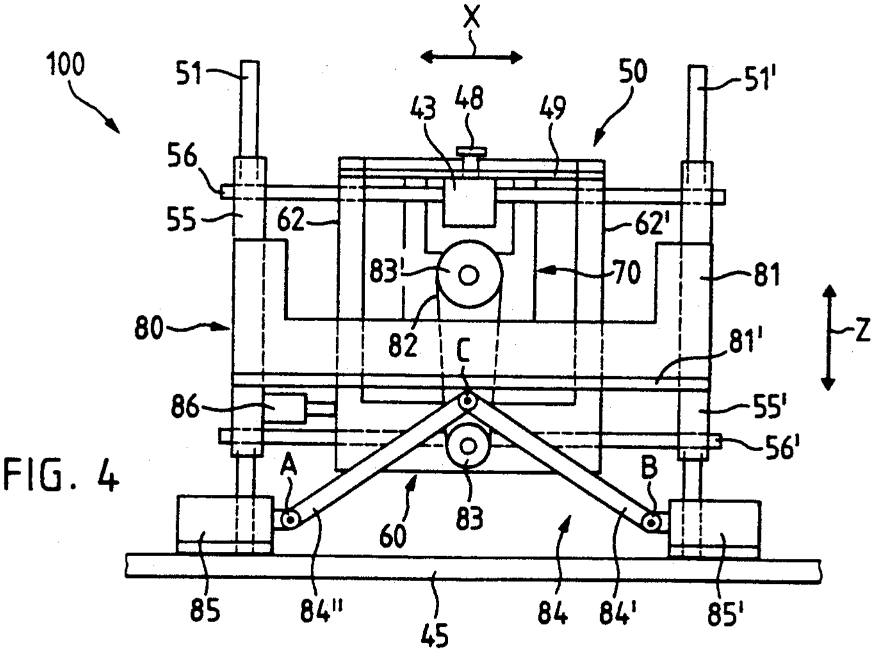
FIG. 4 is a schematic rear view of the winding station.

FIG. 4 shows the apparatus 100 in a rear view. The apparatus 100 further comprises a raising and lowering device 80 operatively connected to winding station 50 and which essentially comprises a carrier part 81, two spaced-apart operating cylinders 85, 85' and a linkage 84 formed of levers 84' and 84'' and operatively connected to carrier part 81. Carrier part 81 provided with a web 81' is fixed by suitable conventional fixing means to the two holding parts 55, 55'. The two cylinders 85, 85' fixed to base plate 45 are connected by means of pivot joints A and B to levers 84, 84', and the two levers are interconnected via a pivot joint C. Through corresponding operation of one or other or both of the cylinders 85, 85', carrier part 81 and the holding parts 55, 55' guided on uprights 51, 51' and the winding station 50 operatively connected by rods 56, 56' are raised or lowered with parts 60 and 70 in the arrow direction Z. The movement in the arrow direction X of the carrier body 60 guided on rods 56, 56' with the pendulum part 70 takes place by means of a cylinder 86 or the like shown in FIG. 4 and e.g. arranged on holding part 55 and fixed thereto by not shown means.

FIG. 4 also shows two spaced-apart disks 83, 83', which are each provided with a tooth system and are operatively interconnected by means of a belt-like drive 82. Disk 83 is operatively connected to an electromotive drive 66 (FIG. 2) arranged in carrier body 60 and disk 83' to the shaft journal 65'' (FIG. 3) of mandrel 65' mounted in the pendulum part 70.

By means of the electromotive drive 66 arranged in the carrier body 60 and diagrammatically shown in FIG. 2, head piece 65 with the fit-on mandrel 65' operatively connected therewith are driven via disk 83 and drive belt 82, disk 83' and simultaneously in the arrow direction 79 for the winding and wrapping of bobbin 78 shown in FIG. 3.

Figure 5:
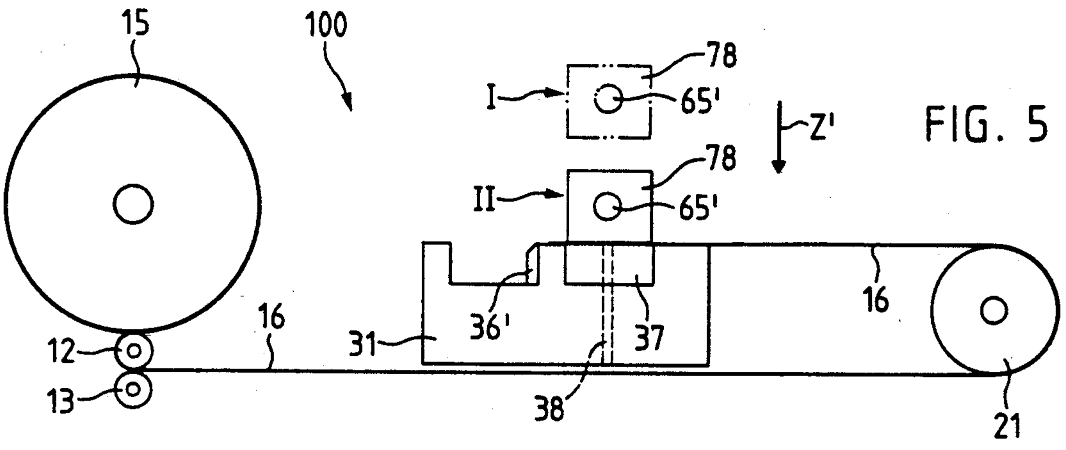
FIGS. 5 to 7 illustrate individual, diagrammatically shown steps for the fixing and wrapping of the electrical winding arranged on a bobbin.
Figure 6:
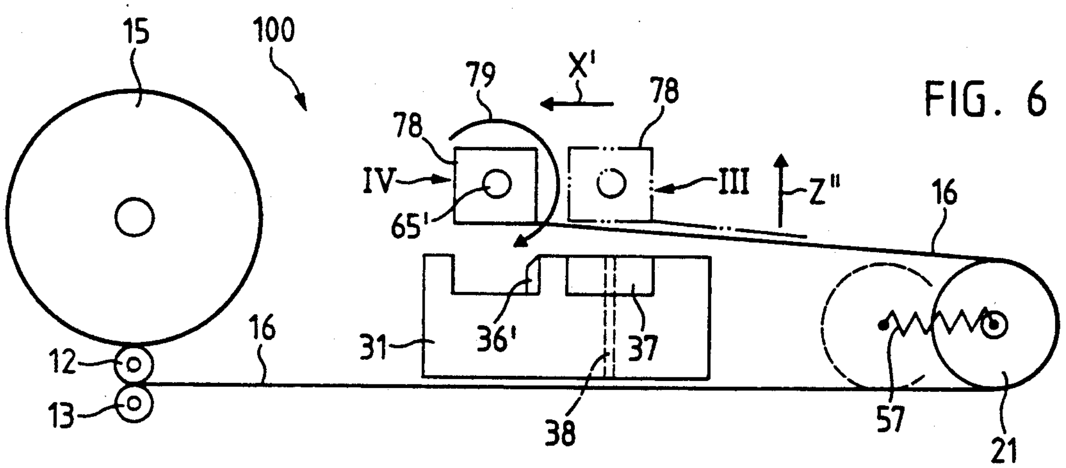
Figure 7:
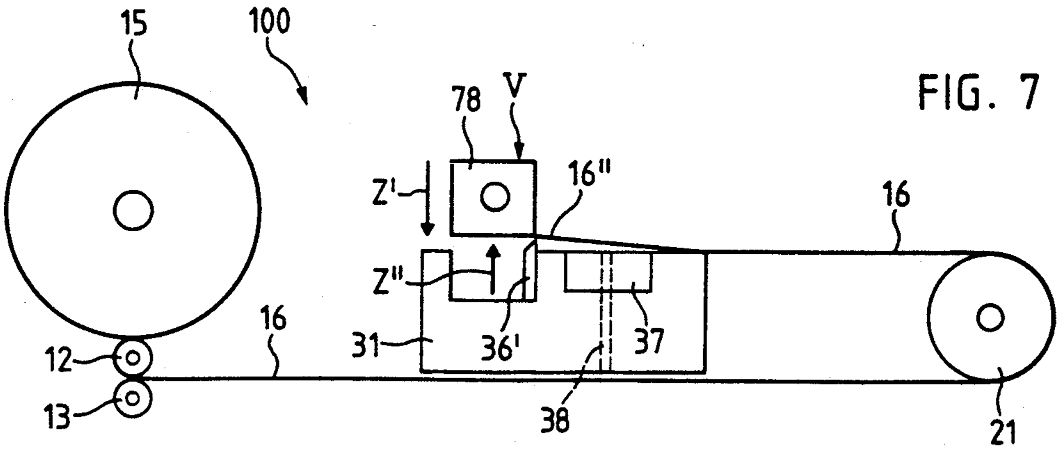

FIGS. 5, 6 and 7 diagrammatically show the essential functional sequences of apparatus 100 and it is possible to see the tape reel 15 with the associated rolls 12, 13, the guide pulley 21 and head piece 31 of the only partly shown application station.

FIG. 5 shows a mounting position I, in which the bobbin 78 shown by dot-dash lines is mounted or fitted onto the fit-on mandrel 65' and is lowered in the arrow direction Z' into contact position II for the adhesive application of tape 16 to the not shown electrical winding of bobbin 78.

In the next stage, bobbin 78 (dot-dash lines) with the tape 16 attached thereto by adhesion is raised in the arrow direction Z'' into position III (FIG. 6) and then moved into the winding position IV in arrow direction X', in which the bobbin 78 is rotated in the arrow direction 79 about the longitudinal axis of the fit-on mandrel 65' for the actual wrapping up or taping process.

After the wrapping or taping process, as seen from FIG. 7, the bobbin 78 is lowered into position V for separating or cutting off the tape 16, and simultaneously, the cutting knife 36' is supplied to tape 16 in arrow direction Z''. The tape end 16'' in FIG. 7 is held by the suction action of vacuum pump V (FIG. 1) in smoothly engaging manner on the surface of bearing part 37, so that tape 16 can be supplied to a new bobbin to be wrapped thereabout (FIG. 5).

The essential working stages of the apparatus 100 in conjunction with the control unit 110, computer 115 and regulators 111 to 114 diagrammatically shown in FIG. 2 are essentially as follows:

The tape 16 removed from the tape reel 15 by the action of the electromotively driven roll 12 and in the course of the taping process (FIG. 6) causes a deflection which is detected by the angle encoder 23, on the guide pulley 21 pivotably mounted against the restoring force of a spring element 57 shown in FIG. 6. This deflection is supplied as a signal corresponding to the tape tension and representing a guidance value, via line 7 to regulator 111 and from the latter via line 1' as a signal representing an adjustment value for controlling drive 19.

During the removal and transporting of the tape, the tape 16 is optronically scanned by means of the sensors 92, 92' of the scanning device 90 oriented against the reference edge 16', and the data determined by the scanning device, are supplied as signals representing a controlled value via line 6 to regulator 113, from the latter via 6' as a signal representing an adjustment result to regulator 112, and from the regulator 112 via line 2' as a signal representing an adjustment value to deflecting device 40. By the adjustment value supplied to the deflecting device 40 there is obtained a deflection or a pivot amount of pendulum part 70 with the fit-on mandrel 65 located thereon and constructed for the plug-in reception of bobbin 78 (FIG. 3), in the direction of arrows P (FIG. 2). The deflection of the pendulum part 70 is detected by the angle encoder 43 and a signal representing a controlled value is supplied via line 3 to regulator 113.

The rotation speed of the fit-on mandrel 65 with the bobbin 78 (arrow direction 79 in FIG. 6) is controlled by means of signals supplied via line 5' to electromotive drive 66 in the form of an adjustable value. The speeds are detected by speed counter 67 and corresponding signals representing controlled values are supplied via line 5 to regulator 114. Angle encoder 68 associated with drive 66 and speed counter 67 supplies, via line 4, computer 115 with signals representing controlled values. From computer 115 signals corresponding to a command value are supplied via lines 8 and 9 to two regulators 113 and 114.

While particular embodiments of the present invention have been shown as described, it will be obvious to those skilled in the art that changes and modifications may be made without departing from the invention in its broader aspects. Therefore, the aim in the appended claims is to cover all changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. Apparatus for wrapping articles, particularly wrapping up an electrical winding applied to a bobbin, with a tape, the apparatus comprising: a tape reel; a reel holder for rotary mounting of the tape reel; a guide pulley for guiding the tape drawn from the tape reel; a fit-on mandrel rotatably driven about a longitudinal axis thereof and receiving the bobbin; means for driving the mandrel; a winding station having means for receiving said fit-on mandrel; a tape contacting and application station associated with said winding station for contacting the tape and adhesively applying the tape to said bobbin; and a scanning device for determining the orientation of the tape with respect to said bobbin, said scanning device being arranged between said guide pulley and said winding station and being adjustable relative to said tape.

2. Apparatus for wrapping articles, particularly wrapping up an electrical winding applied to a bobbin, with a tape, according to claim 1, wherein said winding station further comprises means for adjusting said winding station in a vertical direction and displacing said winding station in a horizontal direction.

3. Apparatus for wrapping articles, particularly wrapping up an electrical winding applied to a bobbin, with a tape, according to claim 2, wherein said adjusting and displacing means includes a carrier part having a deflecting device with an eccentric disk provided thereon, said pendulum part being mounted with an axle on said carrier part and being pivotal relative to said carrier part by said deflecting device in a direction depending on the direction of running of said tape in the horizontal plane.

4. Apparatus according to claim 3, wherein said winding station comprises:

a base plate;

at least two spaced uprights arranged thereon; and holding parts which are vertically adjustable on said spaced uprights; and guide rods for interconnecting said spaced uprights, said carrier part being displaceably mounted on the guide rods together with said pendulum part in the horizontal direction.

5. Apparatus for wrapping articles, particularly wrapping up an electrical winding applied to a bobbin, with a tape, according to claim 4, wherein said tape application station includes a head piece having a bearing part that is interchangeable to accommodate various types of bobbins to be wrapped up, said bearing part having a recess and being connected via a suction channel to a vacuum pump, said bearing part being constructed for smooth engagement with the tape placed on a surface thereof.

6. Apparatus for wrapping up articles, particularly wrapping up an electrical winding applied to a bobbin, with a tape, according to claim 5, wherein said bearing part is made of elastic material.

7. Apparatus for wrapping articles, particularly wrapping up an electrical winding applied to a bobbin, with a tape, according to claim 5, wherein said head piece further comprises a cutting knife movable towards the tape for cutting the tape upon completion of a wrapping process.

8. Apparatus for wrapping articles, particularly wrapping up an electrical winding applied to a bobbin, with a tape, according to claim 4, wherein said guide pulley further comprises:

a shaft;

a disk rotatably mounted about said shaft;

a further shaft eccentrically mounted on said disk, said guide pulley being mounted on said further shaft;

a spring element arranged so as to act on said further shaft so as to permit said guide pulley to deflect in response to tensile stress in the tape; and a measuring device connected to said spring element for detecting tensile stress occurring on the tape during the drawing and wrapping up process against a restoring force of said spring element.

9. A process for wrapping up articles, particularly wrapping up an electrical winding applied to a bobbin, with a tape, the process comprising the steps of:

fitting a bobbin having an electrical winding onto a rotatable fit-on mandrel;

drawing a tape from a rotatable tape reel;

deflecting the tape at a guide pulley arranged at a distance from said tape reel;

applying said tape adhesively to the electrical winding to wrap up the winding while uniformly removing the tape form said tape reel;

bring the bobbin into an inclined position relative to the tape so that the tape is applied helically;

scanning an edge of said tape with scanning means during application of the tape for obtaining tape edge location data;

determining from the scanning step when said fit-on mandrel and said bobbin are brought into alignment with the edge of said tape; and cutting the tape off when the tape edge is in alignment with an edge of the bobbin.

10. A process for wrapping up articles according to claim 9, and further comprising the steps of providing a pendulum part for receiving the fit-on mandrel, and deflecting the pendulum part so that the pendulum part pivots as a function of the data obtained during said edge scanning step.

11. A process for wrapping up articles, according to claim 9, and further comprising the step of driving the tape reel via a roll, the applying step further including supplying a signal as a function of a tensile force acting on the guide pulley, which is deflectably mounted and provided with a spring element for exerting a restoring force, for controlling the drive of the tape reel.

12. A process for wrapping up an electrical winding applied to a bobbin with a tape having a smaller width than the bobbin, the process comprising the steps of:

drawing a tape from a rotatable tape reel;

resting a part of the tape on a support;

bringing the bobbin having the electrical winding in adhesive contact with the tape;

lifting the bobbin together with the tape from the s support;

wrapping up the winding by rotating the bobbin while uniformly removing the tape from the tape reel;

bringing the bobbin into an inclined position relative to the tape and an edge of the tape during the wrapping step so that the tape covers the winding in a helical manner;

continuously scanning the edge of the tape to determine when the tape edge is in a predetermined position in which the tape has reached the edge of the bobbin or an end of the winding;

stopping the wrapping step when the predetermined position is reached;

lowering the wrapped bobbin to a cutting device; and cutting the tape.

* * * * *